US012572215B2

(12) United States Patent
Choi et al.

(10) Patent No.: US 12,572,215 B2
(45) Date of Patent: Mar. 10, 2026

(54) ELECTRONIC DEVICE, AND METHOD FOR PREVENTING/REDUCING MISRECOGNITION OF GESTURE IN ELECTRONIC DEVICE

(71) Applicant: SAMSUNG ELECTRONICS CO., LTD., Suwon-si (KR)

(72) Inventors: Seunghwan Choi, Suwon-si (KR); Yoonsu Kim, Suwon-si (KR); Soonkyu Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/658,065

(22) Filed: May 8, 2024

(65) Prior Publication Data

US 2024/0295931 A1 Sep. 5, 2024

Related U.S. Application Data

(63) Continuation of application No. PCT/KR2022/017118, filed on Nov. 3, 2022.

(30) Foreign Application Priority Data

Dec. 10, 2021 (KR) ........................ 10-2021-0176560
Jan. 4, 2022 (KR) ........................ 10-2022-0000655

(51) Int. Cl.
*G06F 3/01* (2006.01)
*G06V 40/20* (2022.01)
(52) U.S. Cl.
CPC .............. *G06F 3/017* (2013.01); *G06V 40/28* (2022.01)

(58) Field of Classification Search
CPC ... G06F 3/00; G06F 3/01; G06F 3/017; G06F 3/0304; G06F 3/0481; G06F 3/16;
(Continued)

(56) References Cited

U.S. PATENT DOCUMENTS 10,289,204 B2 5/2019 Josephson
2013/0241819 A1 9/2013 Yamashita
(Continued)

FOREIGN PATENT DOCUMENTS

JP 2016520946 A 7/2016
JP 2017-191426 10/2017
(Continued)

OTHER PUBLICATIONS

International Search Report for PCT/KR2022/017118, mailed Jan. 27, 2023, 4 pages.
(Continued)

*Primary Examiner* — Richard J Hong
(74) *Attorney, Agent, or Firm* — NIXON & VANDERHYE P.C.

(57) ABSTRACT
An electronic device according to various embodiments comprises: at least one camera; a display; and a processor; and memory storing instructions that, when executed by the processor, cause the electronic device to: in a first state in which a gesture for executing a function is recognizable, detect, using the camera module, a movement of an object to be recognized for a gesture; and based on identifying that a variation of the detected movement is less than a reference variation during a specified time period, display, on the display, that a recognition of a gesture is in progress, until before the recognition of the gesture is terminated.

15 Claims, 10 Drawing Sheets

(58) Field of Classification Search
CPC ........ G06F 3/167; G06V 10/62; G06V 40/28;
G06V 40/113
See application file for complete search history.

(56) References Cited

U.S. PATENT DOCUMENTS

| | | | |
|---|---|---|---|
| 2014/0304665 A1 | 10/2014 | Holz | |
| 2015/0088336 A1 | 3/2015 | Shin | |
| 2015/0261318 A1* | 9/2015 | Scavezze | ................. G06F 3/017 |
| | | | 345/158 |
| 2016/0124513 A1 | 5/2016 | Dal Zot | |
| 2016/0187990 A1 | 6/2016 | Lee | |
| 2017/0177074 A1* | 6/2017 | Spencer-Harper | ..... G06V 40/28 |
| 2018/0005625 A1 | 1/2018 | Han | |
| 2018/0267617 A1* | 9/2018 | Giannuzzi | ............ G06V 40/113 |
| 2019/0019515 A1 | 1/2019 | Kim | |
| 2021/0247848 A1 | 8/2021 | Huang | |
| 2023/0038499 A1 | 2/2023 | Xu | |

FOREIGN PATENT DOCUMENTS

| | | | |
|---|---|---|---|
| JP | 2017191426 A | 10/2017 | |
| JP | 2018073290 A | 5/2018 | |
| JP | 2018195053 A | 12/2018 | |
| KR | 20080050169 A | 6/2008 | |
| KR | 101404018 B1 | 6/2014 | |
| KR | 20160061149 A | 5/2016 | |
| KR | 101718081 B1 | 3/2017 | |
| KR | 20170055236 A | 5/2017 | |
| KR | 20180002265 A | 1/2018 | |
| KR | 10-2018-0055243 A | 5/2018 | |
| KR | 20190135974 A | 12/2019 | |
| KR | 102187965 B1 | 12/2020 | |
| KR | 20220080399 A | 6/2022 | |

OTHER PUBLICATIONS

Written Opinion of the ISA for PCT/KR2022/017118, mailed Jan. 27, 2023, 4 pages.
Extended European Search Report dated Feb. 10, 2025 issued in European Patent Application No. 22904474.8.
Korean office action dated Nov. 30, 2025 for counterpart KR application 10-2022-0000655.

* cited by examiner

ELECTRONIC DEVICE, AND METHOD FOR PREVENTING/REDUCING MISRECOGNITION OF GESTURE IN ELECTRONIC DEVICE

CROSS-REFERENCE TO RELATED APPLICATIONS

This application is a continuation of International Application No. PCT/KR2022/017118 designating the United States, filed on Nov. 3, 2022, in the Korean Intellectual Property Receiving Office and claiming priority to Korean Patent Application Nos. 10-2021-0176560, filed on Dec. 10, 2021, and 10-2022-0000655, filed on Jan. 4, 2022, in the Korean Intellectual Property Office, the disclosures of each of which are incorporated by reference herein in their entireties.

BACKGROUND

Field

The disclosure relates to a method for preventing and/or reducing misrecognition of a gesture in an electronic device.

Description of Related Art

Various technologies are applied to electronic devices so that users may conveniently use functions of the electronic devices, and examples of the various technologies include gesture recognition technology and voice recognition technology.

In particular, gesture recognition technology is a technology that uses a sensor to sense a movement of a user and then uses a sensing result, which enables a function of an electronic device to be executed only by a gesture of the user.

For an electronic device to recognize a gesture of a user and execute a function, the electronic device may execute the function corresponding to the gesture when the gesture is completed.

However, when the electronic device misrecognizes a gesture of the user not intended to execute the function as the gesture for executing the function, the electronic device may execute the function not intended by the user.

SUMMARY

Embodiments of the disclosure may provide an electronic device capable of preventing/reducing execution of a function not intended by a user by preventing/reducing the electronic device from misrecognizing a gesture of the user not intended to execute the function as a gesture for executing the function, and a method for preventing/reducing misrecognition of a gesture in an electronic device.

An electronic device according to various example embodiments may include: at least one camera, a display, and a processor, and memory storing instructions that, when executed by the processor, cause the electronic device to: detect a movement of a recognition object for a gesture through the camera module in a first state in which a gesture for executing a function is recognizable, and display that a recognition of a gesture is in progress on the display until the recognition of the gesture is terminated based on identifying that a variance in the detected movement is less than a reference variance for a specified time.

A method for preventing and/or reducing misrecognition of a gesture in an electronic device according to various example embodiments may include: detecting a movement of a recognition object for a gesture through a camera module of the electronic device in a first state in which a gesture for executing a function is recognizable, and displaying that a recognition of a gesture is in progress on a display of the electronic device until the recognition of the gesture is terminated based on identifying that a variance in the detected movement is less than a reference variance for a specified time.

According to various example embodiments, it is possible to prevent/reduce an electronic device from misrecognizing a gesture of a user not intended to execute a function as a gesture for executing the function, thereby preventing/reducing a function not intended by the user from being executed.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
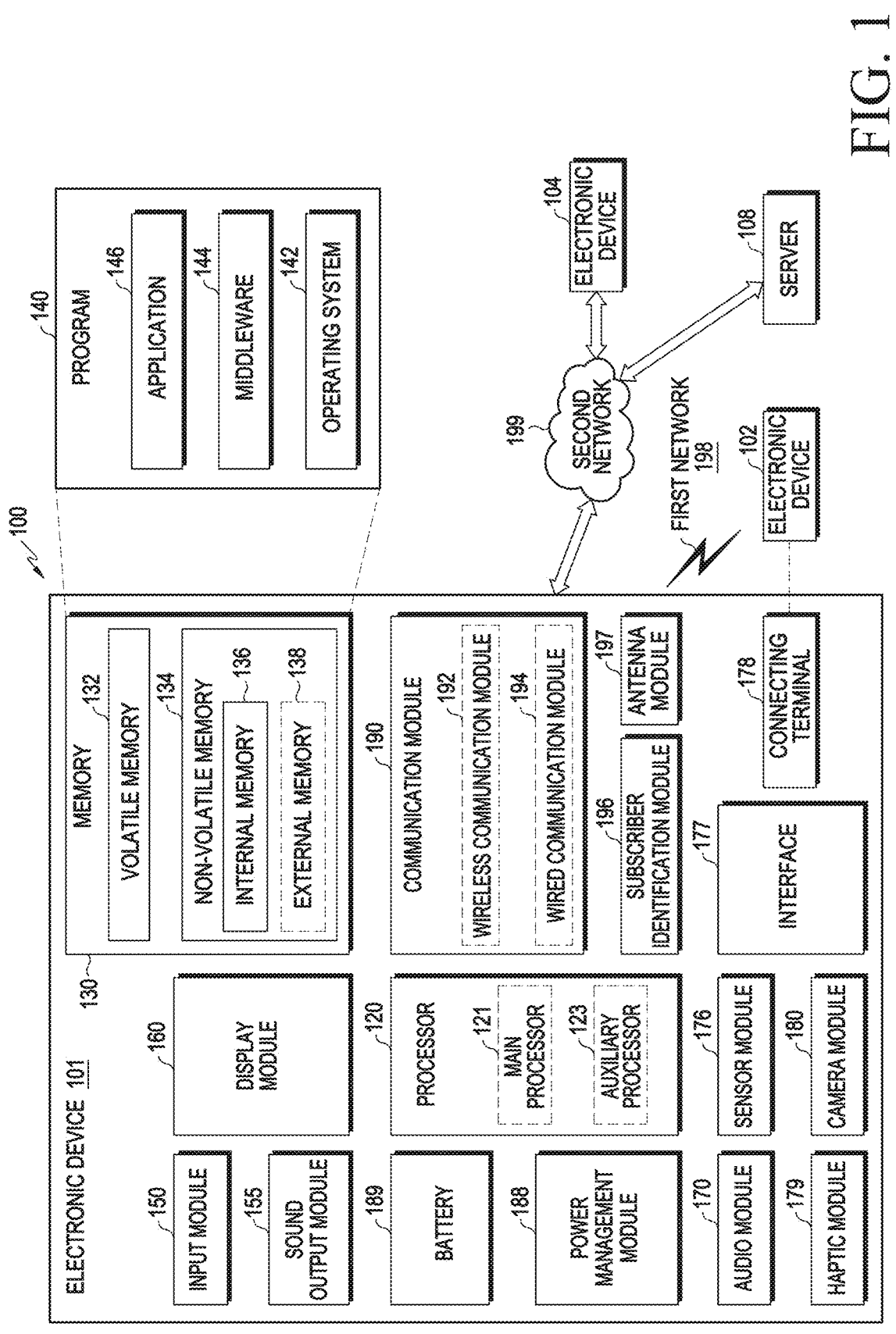
FIG. 1 is a block diagram illustrating an example electronic device in a network environment according to various embodiments.

FIG. 1 is a block diagram illustrating an example electronic device 101 in a network environment 100 according to embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
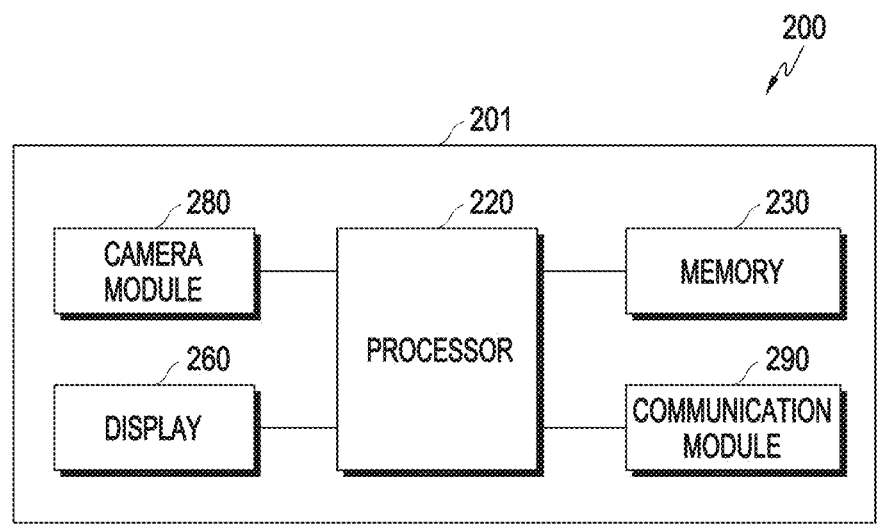
FIG. 2 is a block diagram illustrating an example configuration of an electronic device according to various embodiments.

FIG. 2 is a block diagram 200 illustrating an example configuration of an electronic device according to various embodiments.

Referring to FIG. 2, according to various embodiments, the electronic device 201 (e.g., the electronic device 101 of FIG. 1) may include a processor (e.g., including processing circuitry) 220 (e.g., the processor 120 of FIG. 1), memory 230, a display 260, a camera module (e.g., including a camera) 280, and a communication module (e.g., including communication circuitry) 290.

The processor 220 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to various embodiments, in a first state in which a gesture for executing a function is recognizable, the processor 220 may detect a movement of a recognition object for a gesture, and may display that termination (or cancellation) of recognition of a gesture is in progress until the recognition of the gesture is terminated when identifying that a variance in the detected movement is less than a reference variance for a first specified time. According to an embodiment, "a recognition object" may be referred to as "an object". According to an embodiment, "a recognition of a gesture" may be referred to as "a recognition process of a gesture" or "a recognition operation of a gesture".

According to an embodiment, in the first state, the processor 220 may display that the termination of the recognition of the gesture is in progress on the display 260 while displaying information about remaining time to the termination of the recognition of the gesture as an image. According to an embodiment, "displaying progress" may be referred to as "displaying a state of progress"

According to an embodiment, in the first state, the processor 220 may detect the movement of the recognition object (e.g., a body part of a user) for the gesture, based on an image obtained by the camera module 280 in a state in which the camera module 280 is activated, and may visually provide a process of recognizing the movement for the gesture on the display 260, based on the detected movement.

According to an embodiment, in the first state, the processor 220 may determine progression of the gesture according to the movement of the recognition object until the recognition of the gesture is completed or terminated using gesture information about a preset gesture stored in the memory 230.

According to an embodiment, a motion recognition level for the gesture may be a value representing a recognition progress level of the gesture or a recognition progress level of the gesture according to the movement of the recognition object. The gesture may be a movement of the recognition object, such as a body part (e.g., a hand or arm) of the user, a tool (e.g., a stick) used by the user, or a device (e.g., a remote control or a smart ring) used by the user, drawing a trajectory in a specific direction or shape according to time. The processor 200 may store gesture information about the movement trajectory in the direction and/or shape of the movement in the memory 230 for a time until the preset gesture is completed. The processor 220 may identify at least one dot, line, and/or face of the recognition object as a feature point in a space of two or more dimensions using at least one of the camera module, an image sensor, an IR sensor, a complex optical sensor, or a motion sensor included in the electronic device 201 or connected to the electronic device 202 wirelessly or via a cable (or an external device including at least one of a camera module, an image sensor, an IR sensor, a complex optical sensor, or a motion sensor), or may identify the recognition object through at least one of optical analysis, image analysis, machine learning, or an artificial intelligence technique. The processor 220 may trace the identified at least one dot, line or face of the recognition object or the movement trajectory of the recognition object, thereby recognizing the gesture. The processor 220 may compare the traced trajectory of the recognition object according to the gesture with a preset direction or predetermined shape of the gesture, thereby determining or judging the motion recognition level for the gesture. The processor 220 may load instructions for determining a motion recognition level stored in the memory 230, and may perform operations of determining a motion recognition level. The processor 220 may determine the motion recognition level for the gesture in real time while recognizing a motion of the recognition object, and may record the motion recognition level determined in real time in the memory 230. While one gesture is recognized, a motion recognition level may be determined in real time, and whenever a motion recognition level is determined, a plurality of motion recognition levels may be stored. For example, motion recognition levels of 0% to 100% may be determined until one gesture is completely recognized. Assuming that a gesture includes a series of a plurality of movements, a plurality of motion recognition levels including a first motion recognition level B1 of 0% representing a first movement of the user (e.g., the body part of the user) for the gesture, a second motion recognition level B2 of 25% representing a second movement of the user (e.g., the body part of the user) for the gesture, a third motion recognition level B3 of 50% representing a third movement of the user (e.g., the body part of the user) for the gesture, a fourth motion recognition level B4 of 75% representing a fourth movement of the user (e.g., the body part of the user) for the gesture, and a fifth motion recognition level B5 of 100% representing a fifth movement of the user (e.g., the body part of the user) for the gesture may be determined and stored in the memory 230. The motion recognition level may be generated using at least one of an equation, a recognition algorithm, and/or a main movement of each process depending on the type of the gesture to be recognized.

According to an embodiment, the processor 220 may determine the motion recognition level for the gesture, based on the movement trajectory of the recognition object. For example, while recognizing one gesture according to the height of a hand being raised, the processor 220 may determine a hand height of 30 cm to 10 cm from a shoulder of the user as a motion recognition level of 0% to 100%. For example, while recognizing a gesture of raising a hand at a certain angle, the processor 220 may determine an angle of 0 degrees at which the hand of the user faces a floor as a motion recognition level of 0%, and may determine an angle of up to 135 degrees at which the hand of the user is lifted up as a motion recognition level of 100%.

According to an embodiment, the processor 220 may generate time for which a specific movement of the recognition object is repeated as a motion recognition level. For example, while recognizing one gesture according to hand movement time, the processor 220 may determine a duration of zero to two seconds for which the hand of the user moves from side to side as a motion recognition level of 0% to 100%.

According to an embodiment, the processor 220 may use a probabilistic motion recognition rate through a method, such as machine learning, to determine a motion recognition level of a gesture for a specific shape of the recognition object. For example, to recognize a hand shape as one gesture, when learning a shape of clenching a fist as a motion recognition level of 100%, the processor 220 may determine a motion recognition level of any hand shape by calculating similarity and/or accuracy to a motion of clenching a fist as a range of 0% to 100%.

According to an embodiment, while determining the motion recognition level for the gesture in real time, the processor 220 may also determine a motion recognition expression level in further consideration of an actual intention of the user, a movement different from the gesture being recognized, or a movement or state of not increasing the motion recognition level of the gesture (e.g., a stoppage of the movement). Here, the motion recognition expression level may represent a new/updated motion recognition level determined by reflecting the intention of the user, the movement different from the gesture being recognized, or the degree of the movement or state of not increasing the motion recognition level in the motion recognition level. In the motion recognition level and the motion recognition expression level, a specific movement may be reflected at different times depending on criteria for recognition degrees represented respectively by the motion recognition level and the motion recognition expression level. For example, a specific first movement for the gesture may be reflected first in the motion recognition level and not be reflected in the motion recognition expression (e.g., regarding a movement in a direction different from a progressing direction of the gesture, a degree of the movement in the different direction may be deducted from a previous motion recognition level, and the degree of the movement may not be deducted from a motion recognition expression level), a specific second movement for the gesture may not be reflected in the motion recognition level and be reflected in the motion recognition expression (e.g., regarding a movement in a direction different from the progressing direction of the gesture, a degree of the movement may not be deducted from a motion recognition level, and the degree of the movement may be deducted from a previous motion recognition expression level), or a specific third movement for the gesture may be reflected as some values in the motion recognition level and be reflected as some other values in the motion recognition expression (e.g., a degree corresponding to a level of a movement in a direction different from the progressing direction of the gesture may be deducted from a previous motion recognition level, and a degree corresponding to a time period of the movement in the direction different from the progressing direction of the gesture may be deducted from a previous motion recognition expression level). Although an operation of determining the motion recognition level and an operation of determining the motion recognition expression level have been separately described above, it should be noted that the two operations may be combined to be processed or configured as a single operation of determining a degree of recognition of the gesture according to an embodiment. While determining the motion recognition expression level, the processor 220 may store the motion recognition expression level determined in real time in the memory 230. The processor 220 may determine an interaction with the user for a specific gesture or the completion or termination of the recognition of the gesture, based on the determined or stored motion recognition expression level. The processor 220 may display, to the user, the motion recognition expression level in further consideration of the actual intention of the user, the movement different from the gesture being currently recognized, or the movement or state of not increasing the motion recognition level of the gesture (e.g., the stoppage of the movement), thereby feeding a recognition state of the gesture in the electronic device back to the user. Further, the processor 220 may display the motion recognition expression level through the electronic device, thereby helping the user to easily recognize that the gesture is being input to the electronic device according to the intention of the user and leading the user to continue the gesture according to a gesture recognition state of the electronic device.

According to an embodiment, in the first state, when determining the motion recognition level corresponding to the detected movement of the recognition object for the gesture, the processor 220 may update the motion recognition expression level corresponding to the determined motion recognition level.

According to an embodiment, in the first state, the processor 220 may visually display the process of recognizing the movement of the recognition object for the gesture on the display 260, based on the updated motion recognition expression level.

According to an embodiment, the motion recognition expression level may represent a real-time feedback value for recognition of the movement of the recognition object for the gesture, and a plurality of motion recognition expression levels may be stored for recognition of one gesture. For example, to recognize one gesture, a plurality of motion recognition expression levels including a first motion recognition expression level P1 of 0% representing a feedback value on the first movement of the user (e.g., the body part of the user) for the gesture, a second motion recognition expression level P2 of 25% representing a feedback value on recognition of the second movement of the user (e.g., the body part of the user) for the gesture, a third motion recognition expression level P3 of 50% representing a feedback value on recognition of the third movement of the user (e.g., the body part of the user) for the gesture, a fourth motion recognition expression level P4 of 75% representing a feedback value on the fourth movement of the user (e.g., the body part of the user) for the gesture, and a fifth motion recognition expression level P5 of 100% representing a feedback value on the fifth movement of the user (e.g., the body part of the user) for the gesture may be generated and stored in the memory 230.

According to an embodiment, in the first state, when identifying that the variance in the movement of the recognition object detected by the camera module 280 is less than the reference variance for the first specified time, the processor 220 may determine that there is no increase in the motion recognition level corresponding to the detected movement, and may reduce the motion recognition expression level for a second specified time, based on the motion recognition level not increased (e.g., the maintained motion recognition level).

According to an embodiment, the processor 220 may visually provide, through the display 260, the process of recognizing the movement of the recognition object for the termination of the recognition of the gesture, based on the reduced motion recognition expression level.

According to an embodiment, when identifying that the reduced gesture recognition expression level as a motion recognition expression level for terminating the gesture, the processor 220 may terminate the recognition of the gesture.

For example, in the first state, when identifying that a variance in detected movement of the user (e.g., the body part of the user) is less than the reference variance for the first specified time after determining, based on the detected movement of the user (e.g., the body part of the user) for the gesture, the motion recognition level as the third motion recognition level B3 of 50% representing the third movement of the user (e.g., the body part of the user) for the gesture, the processor 220 may not increase but maintain the motion recognition level. The processor 220 may reduce the motion recognition expression level to the third motion recognition expression level P3 of 50% representing the feedback value on the third movement of the user (e.g., the body part of the user) for the gesture, the second motion recognition expression level P2 of 25% representing the feedback value on the second movement of the user (e.g., the body part of the user) for the gesture, and the first motion recognition expression level P1 of 0% representing the feedback value on the first movement of the user (e.g., the body part of the user) for the gesture in order for the second specified time. The processor 220 may visually display an image corresponding to the motion recognition expression level sequentially reduced on the display 260, thereby providing the user with the process of recognizing the movement of the user (e.g., the body part of the user) for the termination of the recognition of the gesture in real time. When identifying the reduced motion recognition expression level as the first motion recognition expression level P1 of 0% representing the feedback value on the first movement of the user (e.g., the body part of the user) for the gesture, the processor 220 may termination the recognition of the gesture.

According to an embodiment, the variance in the movement of the recognition object being less than the reference variance for the first specified time may refer, for example, to the movement of the recognition object being stopped or a movement different from the movement for the gesture recognized so far has been detected.

According to an embodiment, in the first state, when identifying that the variance in the movement is less than the reference variance for the first specified time due to a stoppage of the movement of the recognition object, the processor 220 may reduce the motion recognition expression level for the second specified time and may visually display the image corresponding to the reduced motion recognition expression level on the display 260, thereby providing the user with the process of recognizing the movement of the recognition object for the termination of the recognition of the gesture in real time. The second specified time for reducing the motion recognition expression level due to the stoppage of the movement of the recognition object may include a specified time (e.g., five seconds) configured by default.

According to an embodiment, in the first state, when identifying that the variance in the movement is less than the reference variance for the first specified time due to detection of the movement different from the movement for the gesture recognized so far, the processor 220 may reduce the motion recognition expression level for the second specified time and may visually display the image corresponding to the reduced motion recognition expression level on the display 260, thereby providing the user with the process of recognizing the movement of the recognition object for the termination of the recognition of the gesture in real time. When detecting the movement different from the movement for the gesture recognized so far, the processor 220 may adjust and determine the second specified time in proportion to a time to be increased from when the different movement is detected to when the recognition of the gesture is completed. For example, when identifying the motion recognition level as the third motion recognition level B3 of 50% representing the third movement of the user (e.g., the body part of the user) for the gesture and then identifying the second motion recognition level B2 of 25% representing the second movement of the user (e.g., the body part of the user) for the gesture, which is the movement of the user (e.g., the body part of the user) different from the movement of the user (e.g., the body part of the user) for the gesture recognized so far, the processor 220 may adjust and determine the second specified time (e.g., two seconds) in proportion to a time (e.g., two seconds) increased to reach the fifth motion recognition level B5 of 100% representing the fifth movement of the user (e.g., the body part of the user) for the gesture.

According to an embodiment, in the first state, when identifying the termination of the recognition of the gesture and then detecting a next movement of the recognition object following the movement of the recognition object detected at a time of the termination of the recognition of the gesture, the processor 220 may not detect the next movement of the recognition object as the movement of the recognition object for the gesture.

According to various embodiments, in the first state in which the gesture for executing the function is recognizable, when detecting a movement of the recognition object for a gesture and identifying that a variance in the detected movement is greater than the reference variation, the processor 220 may perform an operation of completing recognition of the gesture.

According to an embodiment, in the first state, when identifying that the variance in the movement of the recognition object detected by the camera module 280 is greater than the reference variation, the processor 220 may determine a motion recognition level corresponding to the detected movement, and may determine a motion recognition expression level, based on the determined motion recognition level.

According to an embodiment, in the first state, the processor 220 may visually provide a process of recognizing a movement of the recognition object for completion of the recognition of the gesture through the display 260, based on the determined motion recognition expression level.

According to an embodiment, when increasing the motion recognition expression level according to an increase in the motion recognition level corresponding to the detected movement of the recognition object and identifying the increased motion recognition expression level as a motion recognition expression level for the completion of the recognition of the gesture, the processor 220 may execute a function corresponding to the gesture.

For example, in the first state, when determining the motion recognition level as the first motion recognition level B1 of 0% representing the first movement of the user (e.g., the body part of the user) for the gesture, the second motion recognition level B2 of 25% representing the second movement of the user (e.g., the body part of the user) for the gesture, the third motion recognition level B3 of 50% representing the third movement of the user (e.g., the body part of the user) for the gesture, the fourth motion recognition level B4 of 75% representing the fourth movement of the user (e.g., the body part of the user) for the gesture, and the fifth motion recognition level B5 of 100% representing the fifth movement of the user (e.g., the body part of the user) for the gesture in order, based on the movement of the user (e.g., the body part of the user) detected for the recognition of the gesture, the processor 220 may increase the motion recognition expression level to the first motion recognition expression level P1 of 0% representing the feedback value on the first movement of the user (e.g., the body part of the user) for the gesture, the second motion recognition expression level P2 of 25% representing the feedback value on the second movement of the user (e.g., the body part of the user) for the gesture, the third motion recognition expression level P3 of 50% representing the feedback value on the third movement of the user (e.g., the body part of the user) for the gesture, the fourth motion recognition expression level P4 of 75% representing the feedback value on the fourth movement of the user (e.g., the body part of the user) for the gesture, and the fifth motion recognition expression level P5 of 100% representing the feedback value on the fifth movement of the user (e.g., the body part of the user) for the gesture in order, based on the determined motion recognition level. The processor 220 may visually display an image corresponding to the increased motion recognition expression level on the display 260, thereby providing the user with the process of recognizing the movement of the user (e.g., the body part of the user) for the completion of the recognition of the gesture in real time. When identifying the motion recognition expression level as the fifth motion recognition expression level P5 of 100% representing the feedback value on the fifth movement of the user (e.g., the body part of the user) for the gesture while increasing the motion recognition expression level corresponding to the increase in the motion recognition level, the processor 220 may execute the function corresponding to the gesture.

According to various embodiments, in the first state in which the gesture for executing the function is recognizable, when detecting a movement of the recognition object for a gesture and identifying that a variance in the movement of the recognition object is less than the reference variation for the first specified time, the processor 220 may display that termination of recognition of the gesture is in progress on the display 260 until the recognition of the gesture is terminated. When detecting a movement of the recognition object greater than the reference variance while displaying that the termination (cancellation) of the recognition of the gesture is in progress, the processor 220 may lift the termination (cancellation) of the recognition of the gesture, and may display that the recognition of the gesture is in progress on the display 260 while increasing the motion recognition level.

According to an embodiment, in the first state, when identifying that the variance in the movement of the recognition object detected by the camera module 280 is less than the reference variation for the first specified time, the processor 220 may not increase a motion recognition level corresponding to the detected movement or may maintain the motion recognition level, may reduce a motion recognition expression level for the second specified time, and may visually provide a process of recognizing the movement of the recognition object for the termination of the recognition of the gesture through the display 260, based on the reduced motion recognition expression level, thereby performing an operation of terminating the recognition of the gesture.

According to an embodiment, in the first state, while visually providing the process of recognizing the movement of the recognition object for the termination of the recognition of the gesture as the variance in the movement of the recognition object is identified as being less than the reference variation for the first specified time, when identifying that the variance in the movement of the recognition object detected by the camera module 280 is greater than the reference variation before the termination of the recognition of the gesture, the processor 220 may perform an operation of completing the recognition of the gesture again.

For example, in the first state, when identifying that a variance in movement of the user (e.g., the body part of the user) is less than the reference variance for the first specified time after determining, based on the detected movement of the user (e.g., the body part of the user) for the gesture, the motion recognition level as the third motion recognition level B3 of 50% representing the third movement of the user (e.g., the body part of the user) for the gesture, the processor 220 may not increase or may maintain the motion recognition level. When detecting a movement of the user (e.g., the body part of the user) for a gesture corresponding to the fourth motion recognition level B4 of 75% representing the fourth movement of the user (e.g., the body part of the user) for the gesture while reducing the motion recognition expression level to the third motion recognition expression level P3 of 50% representing the feedback value on the third movement of the user (e.g., the body part of the user) for the gesture and the second motion recognition expression level P2 of 25% representing the feedback value on the second movement of the user (e.g., the body part of the user) for the gesture in order for the second specified time, the processor 220 may perform the operation of completing the recognition of the gesture again by providing the fourth motion recognition expression level P4 of 75% representing the feedback value on the fourth movement of the user (e.g., the body part of the user) for the gesture corresponding to the fourth motion recognition level B4.

According to various embodiments, in the first state in which the gesture for executing the function is recognizable, when receiving an input to terminate (or cancel) recognition of a gesture while detecting a movement of the recognition object for the gesture, the processor 220 may terminate the recognition of the gesture before the recognition of the gesture is completed.

According to an embodiment, in the first state, the processor 220 may detect the movement of the recognition object for the gesture using the camera module 280, may determine a motion recognition level corresponding to the detected movement, and may determine a motion recognition expression level, based on an increase in the determined motion recognition level.

According to an embodiment, the processor 220 may visually provide a process of recognizing a movement of the recognition object for completion of the recognition of the gesture through the display 260, based on the determined motion recognition expression level.

According to an embodiment, in the first state, when detecting a gesture set to terminate gesture recognition or receiving a voice command to terminate gesture recognition (e.g., "terminate gesture recognition" or "no") before the completion of the recognition of the gesture while visually providing the process of recognizing the movement of the recognition object for the completion of the recognition of the gesture through the display 260, based on the determined motion recognition expression level, the processor 220 may terminate the recognition of the gesture.

According to various embodiments, the memory 230 may be configured substantially the same as or similar to the memory 130 of FIG. 1.

According to an embodiment, the memory 230 may store a plurality of pieces of gesture information for executing a plurality of functions, and may store instructions to determine a motion recognition level, based on the gesture information, and instructions to determine a motion expression level, based on the motion recognition level.

According to various embodiments, the display 260 may be configured substantially the same as or similar to the display module 160 of FIG. 1.

According to an embodiment, in the first state in which the gesture for executing the function is recognizable, the display 260 may display a process of recognizing a movement of a recognition object for a gesture, based on a motion recognition expression level stored in the memory 230.

According to various embodiments, the camera module 280 may include at least one camera and be configured substantially the same as or similar to the camera module 180 of FIG. 1.

According to an embodiment, in the first state in which the gesture for executing the function is recognizable, the camera module 280 may obtain a movement of a recognition object for a gesture.

According to various embodiments, the communication module 290 may be configured substantially the same as or similar to the communication module 190 of FIG. 1, and may include a plurality of communication circuits using different communication technologies.

According to an embodiment, the communication module 290 may include various communication circuitry, and may include, for example, and without limitation, a plurality of communication circuits, and may include at least one of a wireless LAN module (not shown) and a short-range communication module (not shown), and the short-range communication module (not shown) may include a UWB communication module, a Wi-Fi communication module, a near-field communication (NFC) module, a Bluetooth legacy communication module, and/or a Bluetooth Low Energy (BLE) communication module.

Figure 3:
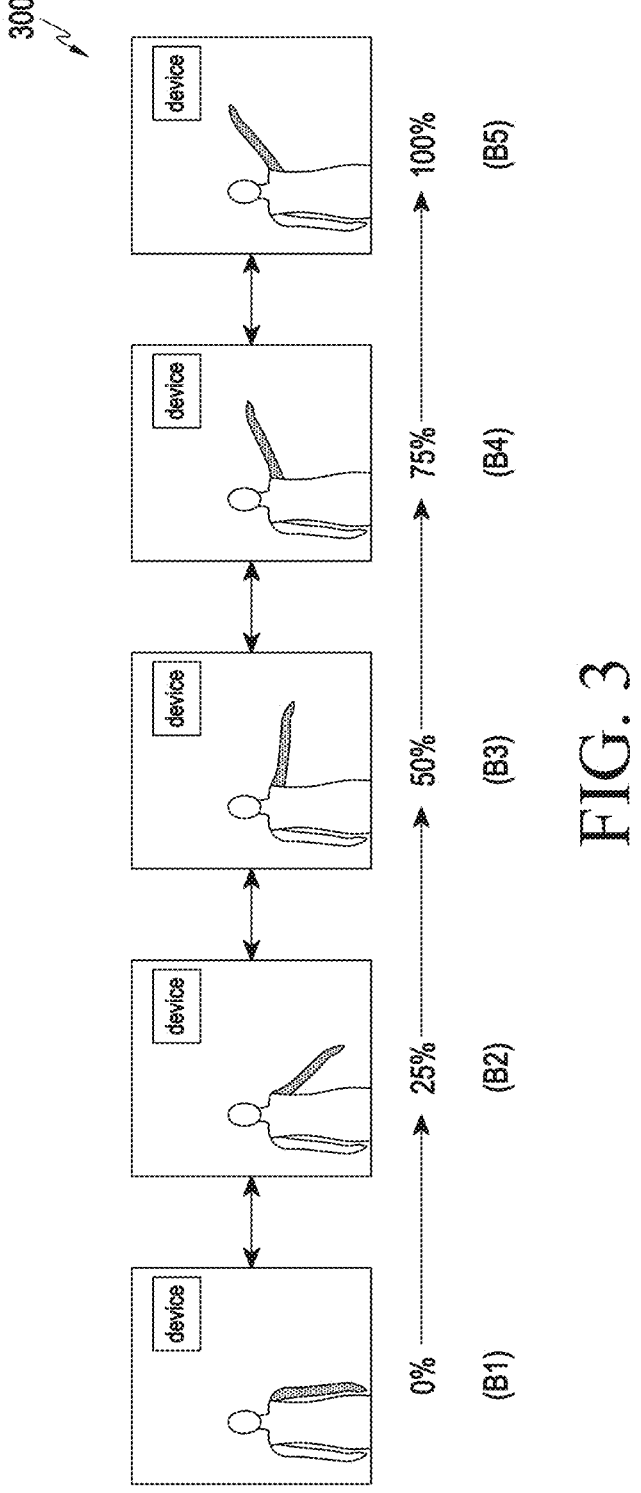
FIG. 3 is a diagram illustrating a motion recognition level for misrecognition of a gesture in an electronic device according to various embodiments.

FIG. 3 is a diagram 300 illustrating an example motion recognition level for misrecognition of a gesture in an electronic device according to various embodiments.

Referring to FIG. 3, a motion recognition level may represent a value for determining progress of a gesture according to a movement of a recognition object, and a plurality of motion recognition levels may be stored in memory (e.g., the memory 230 of FIG. 3) to recognize one gesture. For example, to recognize a gesture of raising a hand and pointing to a device to execute a function, a plurality of motion recognition levels including a first motion recognition level B1 of 0% representing a first movement of a user (e.g., a body part of the user) for the gesture, a second motion recognition level B2 of 25% representing a second movement of the user (e.g., the body part of the user) for the gesture, a third motion recognition level B3 of 50% representing a third movement of the user (e.g., the body part of the user) for the gesture, a fourth motion recognition level B4 of 75% representing a fourth movement of the user (e.g., the body part of the user) for the gesture, and a fifth motion recognition level B5 of 100% representing a fifth movement of the user (e.g., the body part of the user) for the gesture may be generated and stored in the memory.

Figures 4A, 4B:
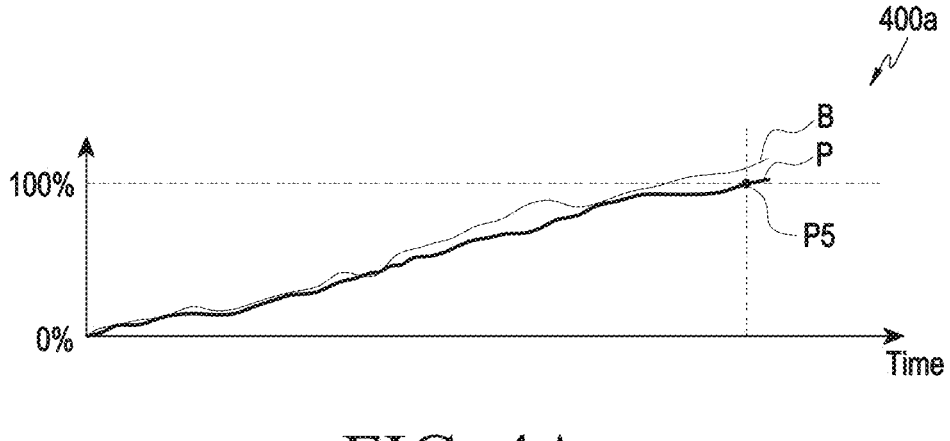
FIG. 4A and FIG. 4B are graphs illustrating movement trajectories for explaining a motion recognition level and a motion recognition expression level for misrecognition of a gesture in an electronic device according to various embodiments.

FIG. 4A and FIG. 4B are graphs 400a and 400b illustrating movement trajectories for explaining a motion recognition level and a motion recognition expression level for misrecognition of a gesture in an electronic device according to various embodiments.

FIG. 4A illustrates movement trajectories for a motion recognition level B and a motion recognition expression level P in which gesture recognition is completed and thus a corresponding function is executable.

In a first state in which a gesture for executing a function is recognizable, the electronic device (e.g., the electronic device 101 of FIG. 1 and/or the electronic device 201 of FIG. 2) may detect a movement of a recognition object for a gesture, may determine a motion recognition level corresponding to the detected movement, and may determine a motion recognition expression level, based on the determined motion recognition level. When identifying that the motion recognition expression level determined corresponding to the motion recognition level is a motion recognition expression level P5 of 100%, the electronic device may execute a function corresponding to the gesture.

FIG. 4B illustrates movement trajectories for a motion recognition level B and a motion recognition expression level P in which gesture recognition is terminable before the gesture recognition is completed.

In a first state in which a gesture for executing a function is recognizable, the electronic device (e.g., the electronic device 101 of FIG. 1 and/or the electronic device 201 of FIG. 2) may detect a movement of a recognition object for a gesture, may determine a motion recognition level corresponding to the detected movement, and may determine a motion recognition expression level, based on the determined motion recognition level.

When identifying a variance in the movement of the recognition object for the gesture is less than a reference variance for a first specified time, the electronic device may not increase but maintain the motion recognition level corresponding to the detected movement, may reduce the motion recognition expression level, based on the motion recognition level not increased but maintained, for a second specified time t1, and may terminate recognition of the gesture when identifying the motion recognition expression level as a motion recognition expression level P1 of 0%.

Figure 5:
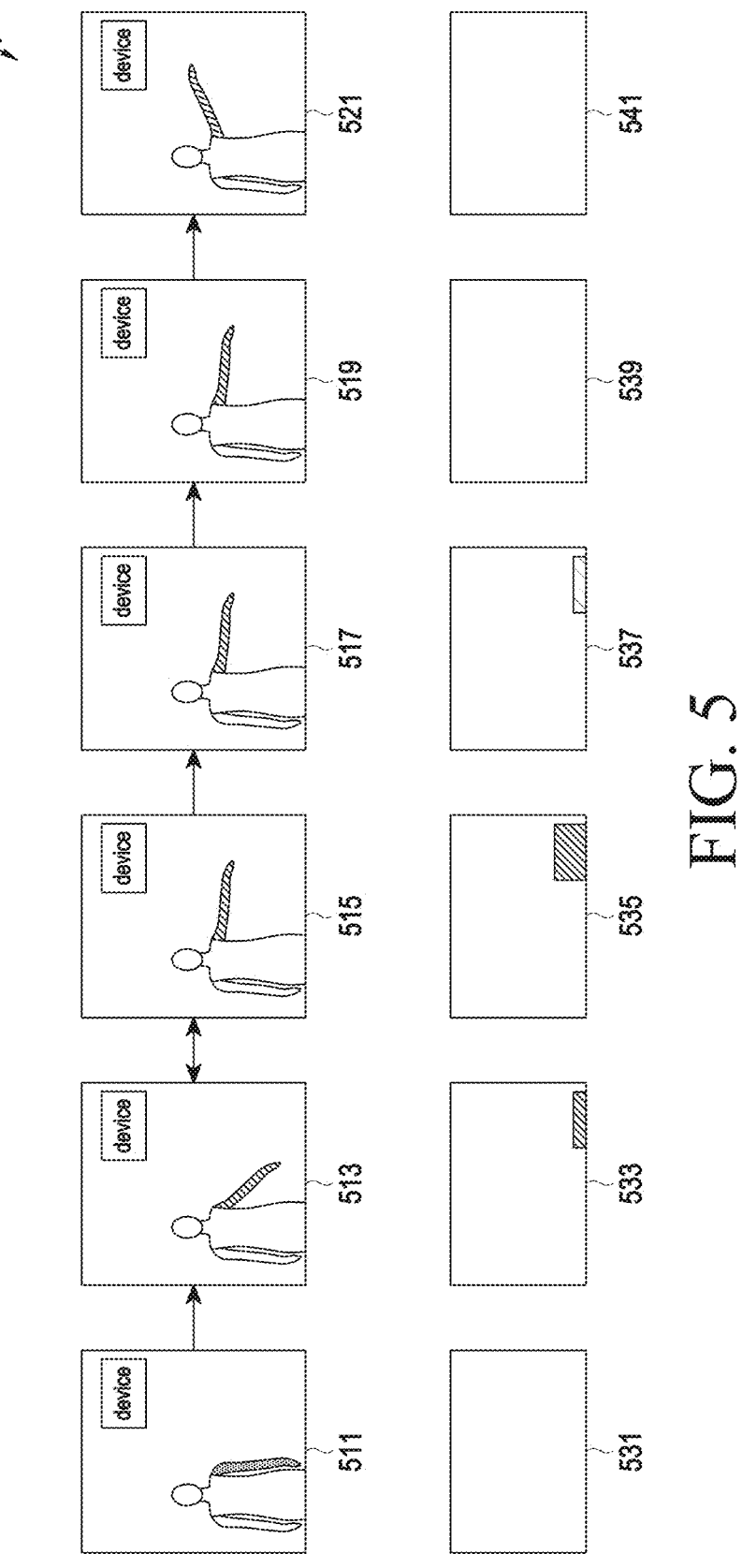
FIG. 5 is a diagram illustrating an example operation of preventing/reducing misrecognition of a gesture in an electronic device according to various embodiments.

FIG. 5 is a diagram 500 illustrating an example operation of preventing/reducing misrecognition of a gesture in an electronic device according to various embodiments. In the example of FIG. 5, a movement of a recognition object may be illustrated as an example of a movement of a user, and the movement of the user may include a movement of a body part of the user or a movement of a tool used by the user.

Referring to FIGS. 5, 511, 513, 515, 517, 519 and 521 illustrate example images including a movement of a recognition object for a gesture obtained by a camera module (e.g., the camera module 280 of FIG. 2) of the electronic device (e.g., the electronic device 101 of FIG. 1 or the electronic device 201 of FIG. 2), and 531, 533, 535, 537, 539 and 541 illustrate and example process of recognizing the movement of the recognition object for the gesture through a display (e.g., the display 260 of FIG. 2) of the electronic device, based on a motion recognition expression level.

In a first state in which a gesture for executing a function is recognizable, the electronic device may detect the movement of the recognition object for the gesture in an image 511 obtained by the camera module of the electronic device. When determining the detected movement of the user as a first motion recognition level of 0% (e.g., the first motion recognition level B1 of FIG. 3) representing a first movement of the user for the gesture, the electronic device may determine a first motion recognition expression level P1 of 0% representing a feedback value on the first movement of the user for the gesture corresponding to the first motion recognition level. The electronic device may not display an image displaying a process of recognizing the movement of the user for the gesture in order to report that a movement of the user for completion of recognition of the gesture is 0% through the display, based on the first motion recognition level P1 (531)

The electronic device may detect a movement of the user for the gesture in an image 513 obtained by the camera module. When determining the detected movement of the user as a second motion recognition level of 25% (e.g., the second motion recognition level B2 of FIG. 3) representing a second movement of the user for the gesture, the electronic device may determine a second motion recognition expression level P2 of 25% representing a feedback value on the second movement of the user for the gesture corresponding to the second motion recognition level B2. The electronic device may display an image displaying the process of recognizing the movement of the user for the gesture in order to report that the movement of the user for the completion of the recognition of the gesture is 25% through the display, based on the second motion recognition level P2 (533).

The electronic device may detect a movement of the user for the gesture in an image 515 obtained by the camera module. When determining the detected movement of the user as a third motion recognition level of 50% (e.g., the third motion recognition level B3 of FIG. 3) representing a third movement of the user for the gesture, the electronic device may determine a third motion recognition expression level P3 of 50% representing a feedback value on the third movement of the user for the gesture corresponding to the third motion recognition level. The electronic device may display an image displaying the process of recognizing the movement of the user for the gesture in order to report that the movement of the user for the completion of the recognition of the gesture is 50% through the display, based on the third motion recognition level P3 (535).

When determining a movement of the user detected by the camera module as the third motion recognition level of 50% (e.g., the third motion recognition level B3 of FIG. 3) representing the third movement of the user for the gesture and identifying that the movement of the user corresponding to the determined third motion recognition level B3 is maintained for a first specified time, the electronic device may not increase the motion recognition level or may maintain the motion recognition level at the third motion recognition level B3. When the motion recognition level is not increased from the third motion recognition level B3 or is maintained at the third motion recognition level B3, the electronic device may determine to reduce the motion recognition expression level for a second specified time, may display an image corresponding to the reduced motion recognition expression level (537 and 539), and may terminate gesture recognition after the second specified time.

In the second specified time for which a movement of the user corresponding to the third motion recognition level (e.g., the third motion recognition level B3 of FIG. 3) is detected in an image 517 obtained by the camera module, the electronic device may display an image displaying a process for terminating recognition of the gesture on the display, based on the second motion recognition expression level P2 reduced from the third motion recognition expression level P3 (537). In the second specified time for which a movement of the user corresponding to the third motion recognition level (e.g., the third motion recognition level B3 of FIG. 3) is detected in an image 519 obtained by the camera module, the electronic device may display an image displaying the process for terminating the recognition of the gesture on the display, based on the first motion recognition expression level P1 reduced from the second motion recognition expression level P2 (539).

Based on the recognition of the gesture being terminated, even though detecting a movement of the user corresponding to a fourth motion recognition level of 75% (e.g., the fourth motion recognition level B4 of FIG. 3) representing a fourth movement of the user for the gesture in an image 521 obtained by the camera module, the electronic device may not recognize the movement of the user as a gesture for executing a function. Even though detecting the movement of the user corresponding to the fourth motion recognition level of 75% representing the fourth movement of the user for the gesture, the electronic device may not display an image displaying the process of recognizing the movement of the user for the gesture on the display (541).

Figure 6:
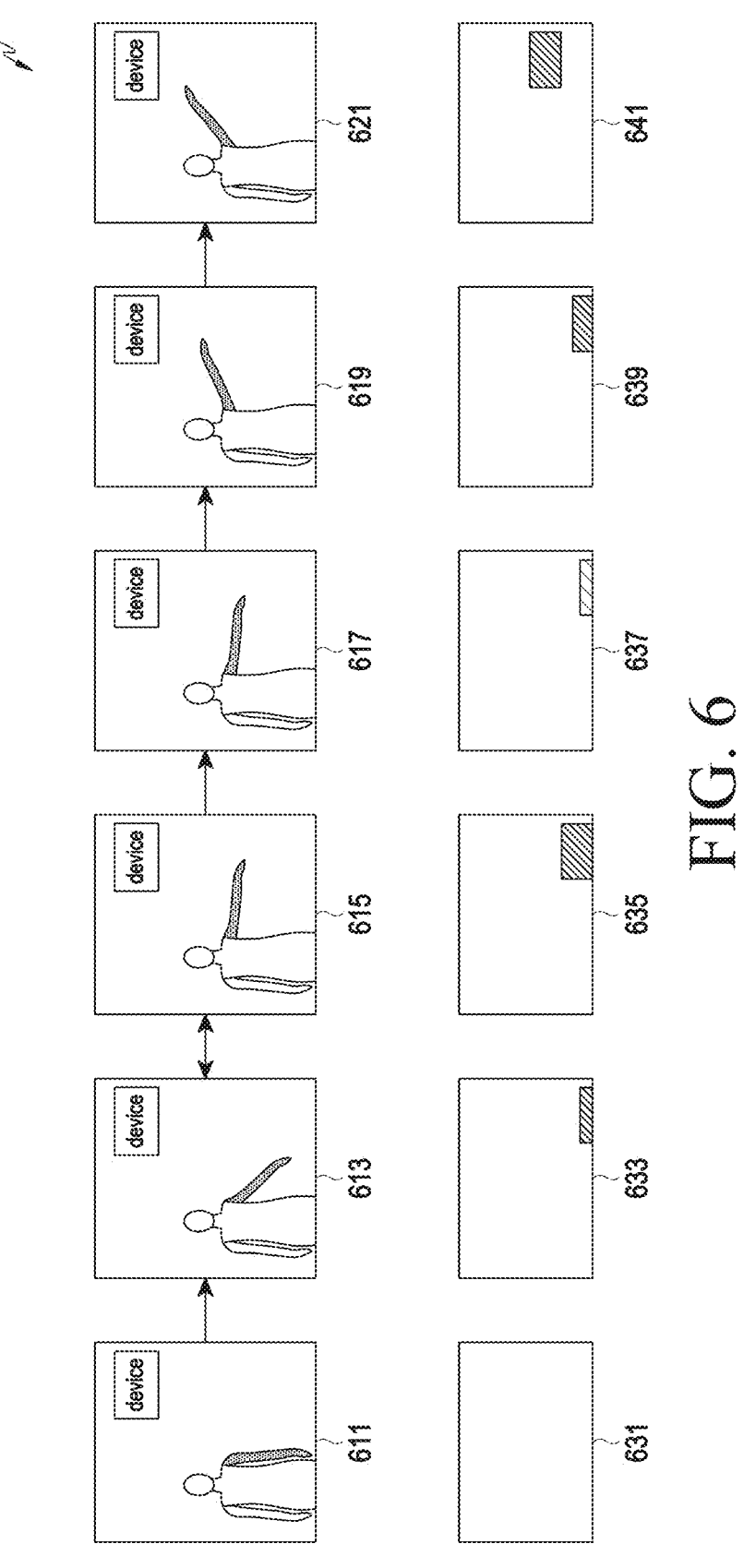
FIG. 6 is a diagram illustrating an example operation of preventing/reducing misrecognition of a gesture in an electronic device according to various embodiments.

FIG. 6 is a diagram 600 illustrating an example operation of preventing/reducing misrecognition of a gesture in an electronic device according to various embodiments. In the example of FIG. 6, a movement of a recognition object may be illustrated as an example of a movement of a user, and the movement of the user may include a movement of a body part of the user or a movement of a tool used by the user.

Referring to FIGS. 6, 611, 613, 615, 617, 619 and 621 illustrated example images including a movement of a user for a gesture obtained by a camera module (e.g., the camera module 280 of FIG. 2) of the electronic device (e.g., the electronic device 101 of FIG. 1 or the electronic device 201 of FIG. 2), and 631, 633, 635, 637, 639 and 641 illustrating an example process of recognizing the movement of the user for the gesture through a display (e.g., the display 260 of FIG. 2) of the electronic device, based on a motion recognition expression level.

In a first state in which a gesture for executing a function is recognizable, the electronic device may detect the movement of the user for the gesture in an image 611 obtained by the camera module of the electronic device. When determining the detected movement of the user as a first motion recognition level of 0% (e.g., the first motion recognition level B1 of FIG. 3) representing a first movement of the user for the gesture, the electronic device may determine a first motion recognition expression level P1 of 0% representing a feedback value on the first movement of the user for the gesture corresponding to the first motion recognition level. The electronic device may not display an image displaying a process of recognizing the movement of the user for the gesture in order to report that a movement of the user for completion of recognition of the gesture is 0% through the display, based on the first motion recognition level P1 (631)

The electronic device may detect a movement of the user for the gesture in an image 613 obtained by the camera module. When determining the detected movement of the user as a second motion recognition level of 25% (e.g., the second motion recognition level B2 of FIG. 3) representing a second movement of the user for the gesture, the electronic device may determine a second motion recognition expression level P2 of 25% representing a feedback value on the second movement of the user for the gesture corresponding to the second motion recognition level. The electronic device may display an image displaying the process of recognizing the movement of the user for the gesture in order to report that the movement of the user for the completion of the recognition of the gesture is 25% through the display, based on the second motion recognition level P2 (633).

The electronic device may detect a movement of the user for the gesture in an image 615 obtained by the camera module. When determining the detected movement of the user as a third motion recognition level of 50% (e.g., the third motion recognition level B3 of FIG. 3) representing a third movement of the user for the gesture, the electronic device may determine a third motion recognition expression level P3 of 50% representing a feedback value on the third movement of the user for the gesture corresponding to the third motion recognition level. The electronic device may display an image displaying the process of recognizing the movement of the user for the gesture in order to report that the movement of the user for the completion of the recognition of the gesture is 50% through the display, based on the third motion recognition level P3 (635).

Subsequently, when determining a movement of the user detected by the camera module as the third motion recognition level of 50% (e.g., the third motion recognition level B3 of FIG. 3) representing the third movement of the user for the gesture and identifying that the movement of the user corresponding to the determined third motion recognition level B3 is maintained for a first specified time, the electronic device may not increase the motion recognition level or may maintain the motion recognition level at the third motion recognition level B3. When the motion recognition level is not increased from the third motion recognition level B3 or is maintained at the third motion recognition level B3, the electronic device may determine to reduce the motion recognition expression level for a second specified time, and may display an image corresponding to the reduced motion recognition expression level on the display.

In the second specified time for which a movement of the user corresponding to the third motion recognition level (e.g., the third motion recognition level B3 of FIG. 3) is detected in an image 617 obtained by the camera module, the electronic device may display an image displaying a process for terminating recognition of the gesture on the display, based on the second motion recognition expression level P2 reduced from the third motion recognition expression level P3 (637).

Before the recognition of the gesture is terminated, when determining a movement of the user detected in an image 619 obtained by the camera module as a fourth motion recognition level of 75% (e.g., the fourth motion recognition level B4 of FIG. 3) representing progress of a fourth movement of the user for the gesture, the electronic device may determine a fourth motion recognition expression level P4 of 75% representing a feedback value on the fourth movement of the user for the gesture corresponding to the fourth motion recognition level B4. The electronic device may display an image displaying the process of recognizing the movement of the user for the gesture on the display in order to report that the movement of the user for the completion of the recognition of the gesture is 75% through the display, based on the fourth motion recognition expression level P4 (639).

When determining a movement of the user detected in an image 621 obtained by the camera module as a fifth motion recognition level of 100% (e.g., the fifth motion recognition level B5 of FIG. 3) representing progress of a fifth movement of the user for the gesture, the electronic device may determine a fifth motion recognition expression level P5 of 100% representing a feedback value on the fifth movement of the user for the gesture corresponding to the fifth motion recognition level. The electronic device may display an image displaying the process of recognizing the movement of the user for the gesture in order to report that the movement of the user for the completion of the recognition of the gesture is 100% through the display, based on the fifth motion recognition expression level P5 (641). When identifying that the motion recognition expression level reaches the fifth motion recognition expression level of 100%, the electronic device may execute a function corresponding to the gesture.

Figure 7:
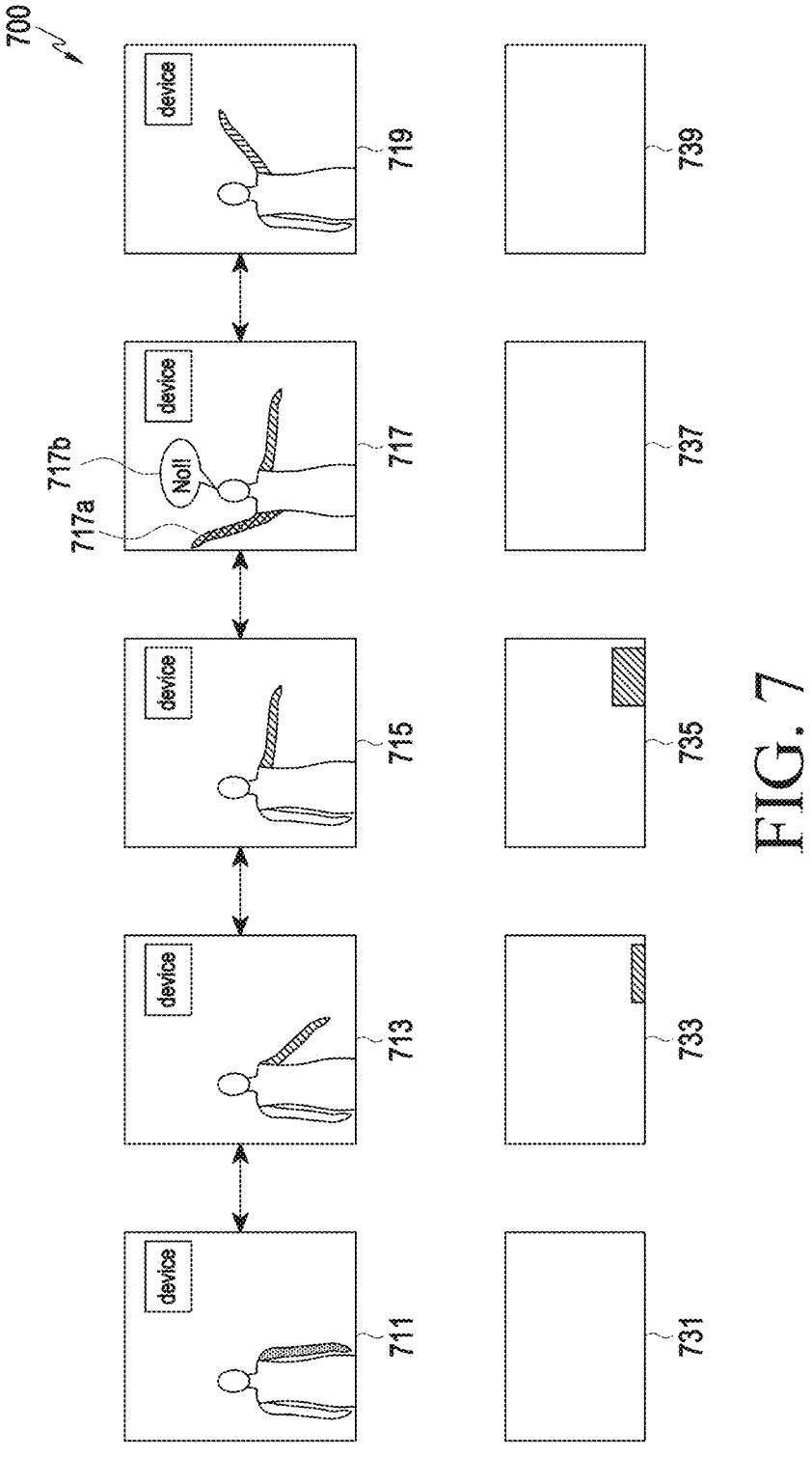
FIG. 7 is a diagram illustrating an example operation of preventing/reducing misrecognition of a gesture in an electronic device according to various embodiments.

FIG. 7 is a diagram 700 illustrating an example operation of preventing/reducing misrecognition of a gesture in an electronic device according to various embodiments. In the example of FIG. 7, a movement of a recognition object may be illustrated as an example of a movement of a user, and the movement of the user may include a movement of a body part of the user or a movement of a tool used by the user.

Referring to FIGS. 7, 711, 713, 715, 717 and 719 illustrate example images including a movement of a user for a gesture obtained by a camera module (e.g., the camera module 280 of FIG. 2) of the electronic device (e.g., the electronic device 101 of FIG. 1 or the electronic device 201 of FIG. 2), and 731, 733, 735, 737 and 739 illustrate an example process of recognizing the movement of the user for the gesture through a display (e.g., the display 260 of FIG. 2) of the electronic device, based on a motion recognition expression level.

In a first state in which a gesture for executing a function is recognizable, the electronic device may detect the movement of the user for the gesture in an image 711 obtained by the camera module of the electronic device. When determining the detected movement of the user as a first motion recognition level of 0% (e.g., the first motion recognition level B1 of FIG. 3) representing a first movement of the user for the gesture, the electronic device may determine a first motion recognition expression level P1 of 0% representing a feedback value on the first movement of the user for the gesture corresponding to the first motion recognition level. The electronic device may not display an image displaying a process of recognizing the movement of the user for the gesture in order to report that a movement of the user for completion of recognition of the gesture is 0% through the display, based on the first motion recognition level P1 (731)

The electronic device may detect a movement of the user for the gesture in an image 713 obtained by the camera module. When determining the detected movement of the user as a second motion recognition level of 25% (e.g., the second motion recognition level B2 of FIG. 3) representing a second movement of the user for the gesture, the electronic device may determine a second motion recognition expression level P2 of 25% representing a feedback value on the second movement of the user for the gesture corresponding to the second motion recognition level. The electronic device may display an image displaying the process of recognizing the movement of the user for the gesture in order to report that the movement of the user for the completion of the recognition of the gesture is 25% through the display, based on the second motion recognition level P2 (733).

The electronic device may detect a movement of the user for the gesture in an image 715 obtained by the camera module. When determining the detected movement of the user as a third motion recognition level of 50% (e.g., the third motion recognition level B3 of FIG. 3) representing a third movement of the user for the gesture, the electronic device may determine a third motion recognition expression level P3 of 50% representing a feedback value on the third movement of the user for the gesture corresponding to the third motion recognition level. The electronic device may display an image displaying the process of recognizing the movement of the user for the gesture in order to report that the movement of the user for the completion of the recognition of the gesture is 50% through the display, based on the third motion recognition level P3 (735).

The electronic device may detect a gesture 717a configured to terminate gesture recognition in an image 717 detected by the camera module or/and may receive a voice command (e.g., "No") 717b to terminate gesture recognition. When receiving the gesture 717a configured to terminate gesture recognition or/and the voice command (e.g., "No") 717b to terminate gesture recognition, the electronic device may not display an image displaying a process for terminating the recognition of the gesture on the display in order to display the termination of the recognition of the gesture, based on the first motion recognition expression level P1 of 0% representing the feedback value on the first movement of the user for the gesture (737).

After the recognition of the gesture is terminated, even though detecting a movement of the user corresponding to a fourth motion recognition level of 75% (e.g., the fourth motion recognition level B4 of FIG. 3) representing a fourth movement of the user for the gesture in an image 721 obtained by the camera module, the electronic device may not recognize the movement of the user as a gesture for executing a function. Even though detecting the movement of the user corresponding to the fourth motion recognition level B4 of 75% representing the fourth movement of the user for the gesture, the electronic device may not display an image displaying the process of recognizing the movement of the user for the gesture on the display (739).

According to various example embodiments, an electronic device (e.g., the electronic device 201 of FIG. 2) may include: at least one camera (e.g., the camera module 2180 of FIG. 2), a display (e.g., the display 260 of FIG. 2), and a processor (e.g., the processor 230 of FIG. 2), and memory storing instructions that, when executed by the processor, cause the electronic device to: detect a movement of a recognition object for a gesture through the at least one camera in a first state in which a gesture for executing a function is recognizable, and display that a recognition of a gesture is in progress on the display until the recognition of the gesture is terminated based on identifying that a variance in the detected movement is less than a reference variance for a specified time.

According to various example embodiments, wherein the instructions, when executed by the processor, cause the electronic device to: display that the termination of the recognition of the gesture is in progress while displaying information about a remaining time to the termination of the recognition of the gesture as an image.

According to various example embodiments, wherein the instructions, when executed by the processor, cause the electronic device to: determine a motion recognition level representing recognition progress information about the gesture according to the movement based on detecting the movement of the recognition through the at least one camera in the first state; determine that the detected movement is a movement different from the gesture being recognized or a movement not to increase a motion recognition level, and update the motion recognition level when identifying that the variance in the detected movement is less than the reference variance for the specified time in the first state; cause the electronic device to visually display that the termination of the recognition of the gesture is in progress on the display, based on the updated motion recognition level, until the recognition of the gesture is terminated; and determine to increase a motion recognition level, and update the motion recognition level based on identifying that the variance in the detected movement is greater than the reference variance in the first state.

According to various example embodiments, wherein the instructions, when executed by the processor, cause the electronic device to: visually display progress of the recognition of the gesture on the display, based on the updated motion recognition level.

According to various example embodiments, wherein the instructions, when executed by the processor, cause the electronic device to: terminate of the recognition of the gesture, and display progress of the recognition of the gesture while increasing a motion recognition level, based on detecting a variance in the movement of the recognition object greater than the reference variance while displaying that the recognition of the gesture is in progress, According to various embodiments, wherein the instructions, when executed by the processor, cause the electronic device to: display progress of the recognition of the gesture while increasing a motion recognition level when identifying that the variance in the detected movement is greater than the reference variance in the first state, and terminate the recognition of the gesture based on detecting a gesture set to terminate the recognition of the gesture while displaying the progress of the recognition of the gesture.

According to various example embodiments, wherein the instructions, when executed by the processor, cause the electronic device to: display progress of the recognition of the gesture while increasing a motion recognition level based on identifying that the variance in the detected movement is greater than the reference variance in the first state, and terminate the recognition of the gesture based on receiving a voice instruction to terminate the recognition of the gesture while displaying the progress of the recognition of the gesture.

Figure 8:
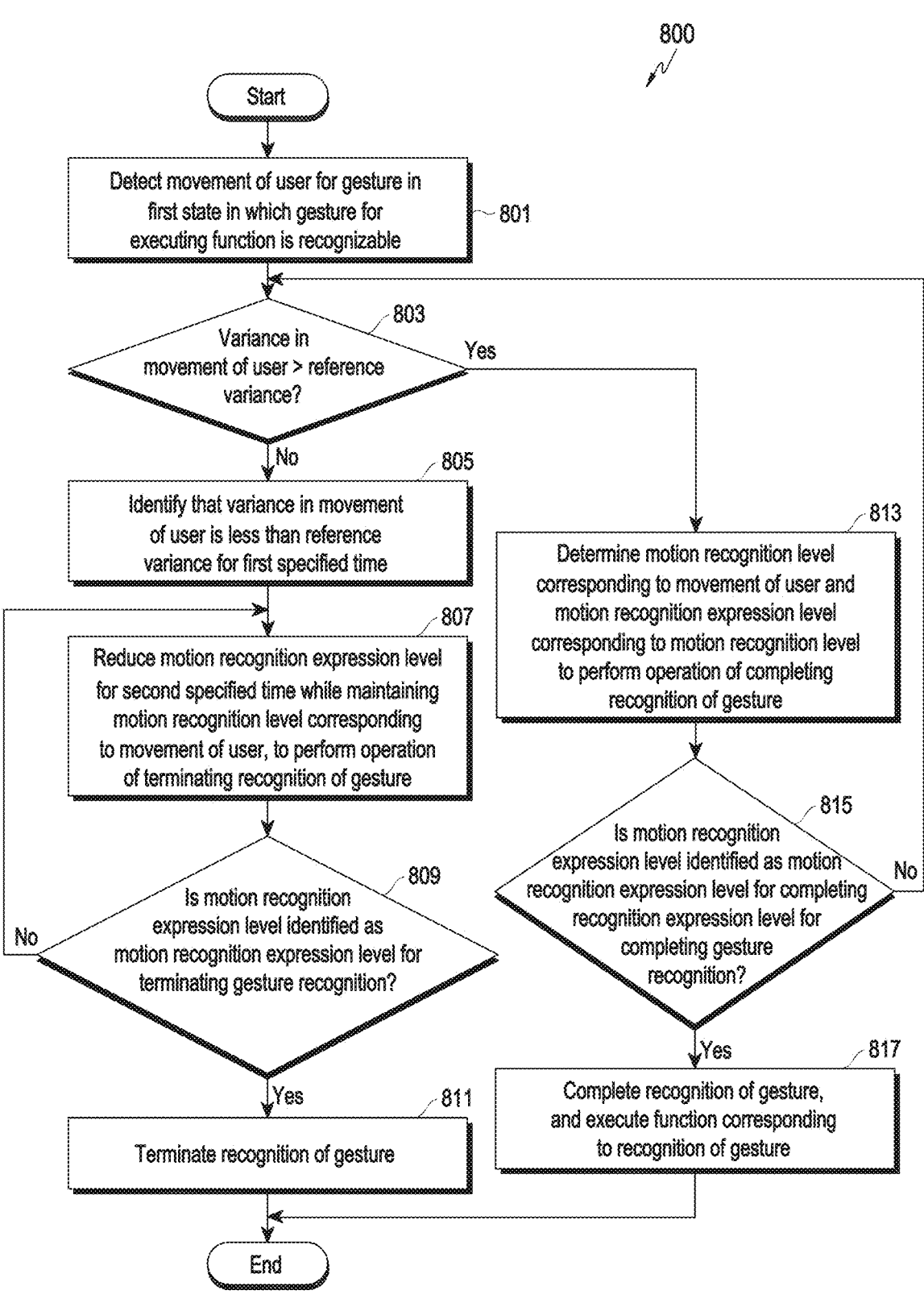
FIG. 8 is a flowchart illustrating an example operation of preventing/reducing misrecognition of a gesture in an electronic device according to various embodiments.

FIG. 8 is a flowchart 800 illustrating an example operation of preventing/reducing misrecognition of a gesture in an electronic device according to various embodiments. Operations of preventing/reducing the misrecognition of the gesture may include operation 801 to operation 817. According to an embodiment, at least one of operation 801 to operation 817 may be omitted, some operations may be performed in a different order, or another operation may be added. In the example of FIG. 8, a movement of a recognition object may be illustrated as an example of a movement of a user, and the movement of the user may include a movement of a body part of the user or a movement of a tool used by the user.

In operation 801, the electronic device (e.g., the electronic device 101 of FIG. 1 and/or the electronic device 201 of FIG. 2) may detect a movement of a user for a gesture in a first state in which a gesture for executing a function is recognizable.

According to an embodiment, in the first state, the electronic device may detect the movement of the user for the gesture, based on an image obtained by a camera module (e.g., the camera module 280) in a state in which the camera module is activated, and may visually provide a process of recognizing the movement of the user for the gesture through a display (e.g., the display 260 of FIG. 2), based on the detected movement of the user.

According to an embodiment, in the first state, the electronic device may determine a motion recognition level corresponding to the detected movement of the user.

In operation 803, the electronic device (e.g., the electronic device 101 of FIG. 1 and/or the electronic device 201 of FIG. 2) may compare a variance in the movement of the user with a reference variance.

The electronic device (e.g., the electronic device 101 of FIG. 1 and/or the electronic device 201 of FIG. 2) may identify that the variance in the movement of the user is less than the reference variance as a result of comparing the variance in the movement of the user with the reference variance in operation 803, and may identify that the variance in the movement of the user is less than the reference variance for a first specified time in operation 805.

According to an embodiment, the variance in the movement of the user being less than the reference variance for the first specified time may refer, for example, to the movement of the user being stopped or a movement of the user different from the movement of the user for the gesture recognized so far being detected.

In operation 807, to perform an operation of terminating recognition of the gesture, the electronic device (e.g., the electronic device 101 of FIG. 1 and/or the electronic device 201 of FIG. 2) may reduce a motion recognition expression level for a second specified time while maintaining the motion recognition level corresponding to the movement of the user.

According to an embodiment, in the first state, when identifying that the variance in the movement of the user is less than the reference variance for the first specified time, the electronic device 201 may not increase but maintain the motion recognition level corresponding to the detected movement of the user, and may reduce the motion recognition expression level for the second specified time.

According to an embodiment, the electronic device 201 may visually provide a process for terminating the recognition of the gesture through the display (e.g., the display 260 in FIG. 2), based on the reduced motion recognition expression level.

In operation 809, the electronic device (e.g., the electronic device 101 of FIG. 1 and/or the electronic device 201 of FIG. 2) may determine whether the motion recognition expression level is a motion recognition expression level for terminating gesture recognition.

When identifying that the motion recognition expression level reduced as the motion recognition level is maintained is not the motion recognition expression level for terminating gesture recognition in operation 809, the electronic device (e.g., the electronic device 101 of FIG. 1 and/or the electronic device 201 of FIG. 2) may reduce the motion recognition expression level while maintaining the motion recognition level for the second specified time by repeating operation 807 and operation 809.

According to an embodiment, the electronic device may visually display an image corresponding to the reduced motion recognition expression level on the display, thereby providing the user with the process for terminating the recognition of the gesture in real time.

When identifying that the motion recognition expression level reduced as the motion recognition level is maintained is the motion recognition expression level for terminating gesture recognition in operation 809, the electronic device (e.g., the electronic device 101 of FIG. 1 and/or the electronic device 201 of FIG. 2) may terminate the recognition of the gesture in operation 811.

According to an embodiment, when identifying that the motion recognition expression level is a first motion recognition expression level P1 of 0% representing a feedback value on a first movement of the user for the gesture for the second specified time, the electronic device may terminate the recognition of the gesture.

When identifying that the variance in the movement of the user is greater than the reference variance as a result of comparing the variance in the movement of the user with the reference variance in operation 803, the electronic device (e.g., the electronic device 101 of FIG. 1 and/or the electronic device 201 of FIG. 2) may determine a motion recognition level corresponding to the movement of the user and a motion recognition expression level corresponding to the motion recognition level to perform an operation of completing the recognition of the gesture in operation 813.

According to an embodiment, when determining the motion recognition level corresponding to the detected movement of the user as a motion recognition level increased from the previous motion recognition level, the electronic device may determine a motion recognition expression level increased from a previous motion recognition expression level, based on an increase in the determined motion recognition level, and may visually provide a process of recognizing a movement of the user for completion of the recognition of the gesture through the display (e.g., the display 260 of FIG. 2), based on the increased motion recognition expression level.

In operation 815, the electronic device (e.g., the electronic device 101 of FIG. 1 and/or the electronic device 201 of FIG. 2) may identify whether the motion recognition level is a motion recognition expression level for completing gesture recognition.

When identifying that the motion recognition expression level is not the motion recognition expression level for completing gesture recognition in operation 815, the electronic device (e.g., the electronic device 101 of FIG. 1 and/or the electronic device 201 of FIG. 2) may increase the motion recognition level, may increase the motion recognition expression level corresponding to the increased motion recognition level, and may visually provide the process of recognizing the movement of the user for the completion of the recognition of the gesture through the display, based on the increased motion recognition expression level by repeating operation 803, operation 813, and operation 815.

When identifying that the motion recognition expression level is the motion recognition expression level for completing gesture recognition in operation 815, the electronic device (e.g., the electronic device 101 of FIG. 1 and/or the electronic device 201 of FIG. 2) may complete the recognition of the gesture, and may execute a function corresponding to the recognition of the gesture in operation 817.

According to an embodiment, when identifying that the motion recognition expression level is a fifth motion recognition expression level P5 of 100% representing a feedback value on a fifth movement of the user for the gesture, the electronic device may complete the recognition of the gesture, and may execute the function corresponding to the recognition of the gesture.

Figure 9:
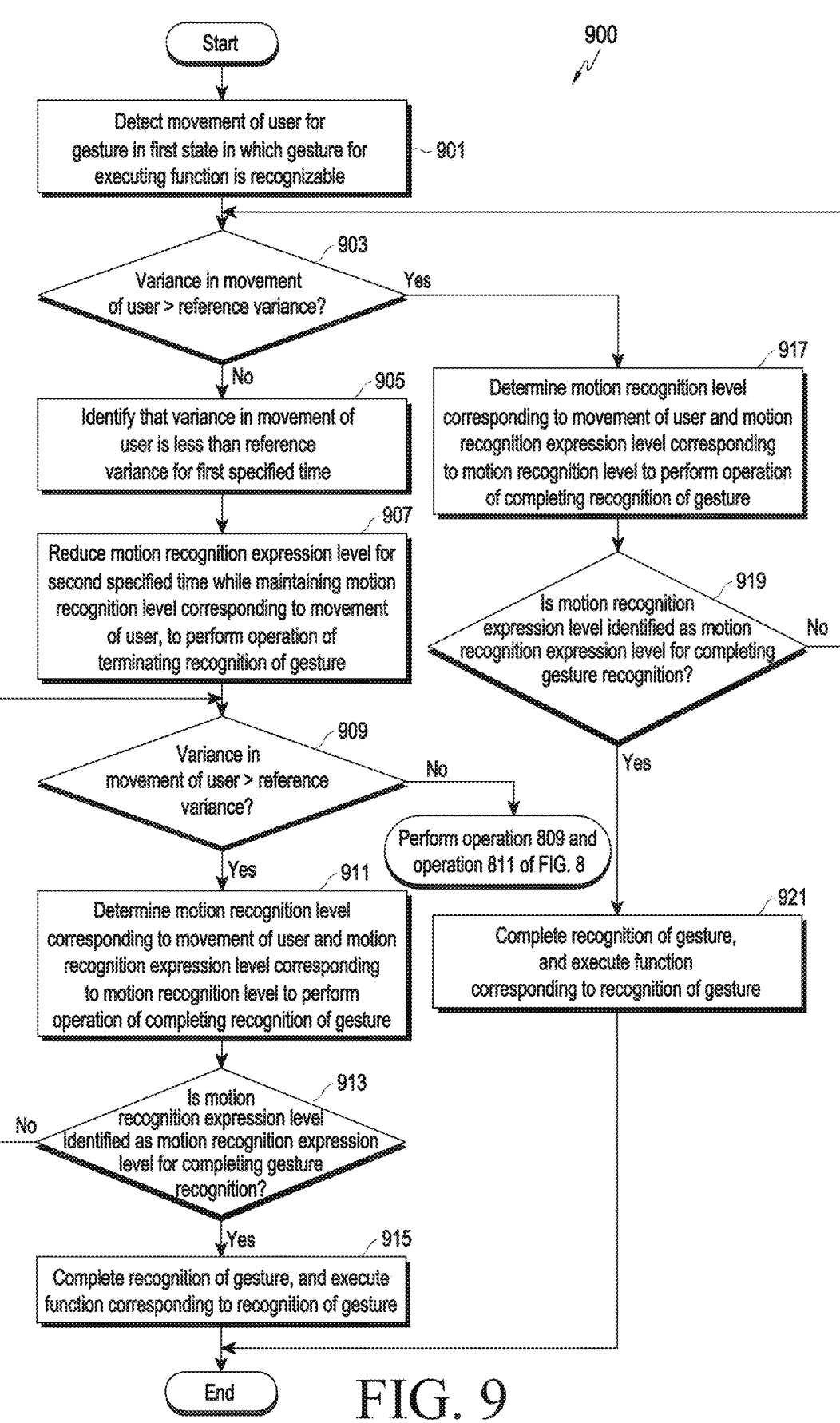
FIG. 9 is a flowchart illustrating an example operation of preventing/reducing misrecognition of a gesture in an electronic device according to various embodiments.

FIG. 9 is a flowchart 900 illustrating an example operation of preventing/reducing misrecognition of a gesture in an electronic device according to various embodiments. Operations of preventing/reducing the misrecognition of the gesture may include operation 901 to operation 921. According to an embodiment, at least one of operation 901 to operation 921 may be omitted, some operations may be performed in a different order, or another operation may be added. In the example of FIG. 9, a movement of a recognition object may be illustrated as an example of a movement of a user, and the movement of the user may include a movement of a body part of the user or a movement of a tool used by the user.

In operation 901, the electronic device (e.g., the electronic device 101 of FIG. 1 and/or the electronic device 201 of FIG. 2) may detect a movement of a user for a gesture in a first state in which a gesture for executing a function is recognizable.

According to an embodiment, in the first state, the electronic device may detect the movement of the user for the gesture, based on an image obtained by a camera module (e.g., the camera module 280) in a state in which the camera module is activated, and may visually provide a process of recognizing the movement of the user for the gesture through a display (e.g., the display 260 of FIG. 2), based on the detected movement of the user.

According to an embodiment, in the first state, the electronic device may determine a motion recognition level corresponding to the detected movement of the user.

In operation 903, the electronic device (e.g., the electronic device 101 of FIG. 1 and/or the electronic device 201 of FIG. 2) may compare a variance in the movement of the user with a reference variance.

The electronic device (e.g., the electronic device 101 of FIG. 1 and/or the electronic device 201 of FIG. 2) may identify that the variance in the movement of the user is less than the reference variance as a result of comparing the variance in the movement of the user with the reference variance in operation 903, and may identify that the variance in the movement of the user is less than the reference variance for a first specified time in operation 905.

According to an embodiment, the variance in the movement of the user being less than the reference variance for the first specified time may refer, for example, to the movement of the user has stopped or a movement of the user different from the movement of the user for the gesture recognized so far has been detected.

In operation 907, to perform an operation of terminating recognition of the gesture, the electronic device (e.g., the electronic device 101 of FIG. 1 and/or the electronic device 201 of FIG. 2) may reduce a motion recognition expression level for a second specified time while maintaining the motion recognition level corresponding to the movement of the user.

According to an embodiment, in the first state, when identifying that the variance in the movement of the user is less than the reference variance for the first specified time, the electronic device 201 may not increase but maintain the motion recognition level corresponding to the detected movement of the user, and may reduce the motion recognition expression level for the second specified time in which the motion recognition level is maintained.

According to an embodiment, the electronic device 201 may visually provide a process for terminating the recognition of the gesture through the display (e.g., the display 260 in FIG. 2), based on the reduced motion recognition expression level.

In operation 909, the electronic device (e.g., the electronic device 101 of FIG. 1 and/or the electronic device 201 of FIG. 2) may compare the variance in the movement of the user with the reference variance.

When identifying that the variance in the movement of the user is greater than the reference variance as a result of comparing the variance in the movement of the user with the reference variance in operation 909, the electronic device (e.g., the electronic device 101 of FIG. 1 and/or the electronic device 201 of FIG. 2) may determine a motion recognition level corresponding to the movement of the user and a motion recognition expression level corresponding to the motion recognition level to perform an operation of completing the recognition of the gesture in operation 911.

According to an embodiment, in the first state, while visually providing the process for terminating the recognition of the gesture through the display (e.g., the display 260 of FIG. 2) as identifying that the variance in the movement of the user is less than the reference variance for the first specified time, when identifying that the variance in the movement of the user detected by the camera module (e.g., the camera module 280 of FIG. 2) is greater than the reference variance before the recognition of the gesture is terminated, the electronic device may perform the operation of completing the recognition of the gesture.

According to an embodiment, when determining the motion recognition level corresponding to the detected movement of the user as a motion recognition level increased from the previous motion recognition level, the electronic device may determine an increased motion recognition expression level, based on an increase in the determined motion recognition level, and may visually provide a process of recognizing the movement of the user for completion of the recognition of the gesture through the display (e.g., the display 260 of FIG. 2), based on the increased motion recognition expression level.

In operation 913, the electronic device (e.g., the electronic device 101 of FIG. 1 and/or the electronic device 201 of FIG. 2) may identify whether the motion recognition expression level is a motion recognition expression level for completing gesture recognition.

When identifying that the motion recognition expression level is not the motion recognition expression level for completing gesture recognition in operation 913, the electronic device (e.g., the electronic device 101 of FIG. 1 and/or the electronic device 201 of FIG. 2) may increase the motion recognition level, may increase the motion recognition expression level corresponding to the increased motion recognition level, and may visually provide the process of recognizing the movement of the user for the completion of the recognition of the gesture through the display, based on the increased motion recognition expression level by repeating operation 909 to operation 913.

When identifying that the motion recognition expression level is the motion recognition expression level for completing gesture recognition in operation 913, the electronic device (e.g., the electronic device 101 of FIG. 1 and/or the electronic device 201 of FIG. 2) may complete the recognition of the gesture, and may execute a function corresponding to the recognition of the gesture in operation 915.

According to an embodiment, when identifying that the motion recognition expression level is a fifth motion recognition expression level P5 of 100% representing a feedback value on a fifth movement of the user for the gesture, the electronic device may complete the recognition of the gesture, and may execute the function corresponding to the recognition of the gesture.

When identifying that the variance in the movement of the user is less than the reference variance as a result of comparing the variance in the movement of the user with the reference variance in operation 909, the electronic device (e.g., the electronic device 101 of FIG. 1 and/or the electronic device 201 of FIG. 2) may perform operation 809 and operation 811 of FIG. 8.

When identifying that the variance in the movement of the user is greater than the reference variance as a result of comparing the variance in the movement of the user with the reference variance in operation 903, the electronic device (e.g., the electronic device 101 of FIG. 1 and/or the electronic device 201 of FIG. 2) may determine a motion recognition level corresponding to the movement of the user and a motion recognition expression level corresponding to the motion recognition level to perform an operation of completing the recognition of the gesture in operation 917.

According to an embodiment, when determining the motion recognition level corresponding to the detected movement of the user as a motion recognition level increased from the previous motion recognition level, the electronic device may determine an increased motion recognition expression level, based on an increase in the determined motion recognition level, and may visually provide a process of recognizing a movement of the user for completion of the recognition of the gesture through the display (e.g., the display 260 of FIG. 2), based on the increased motion recognition expression level.

In operation 919, the electronic device (e.g., the electronic device 101 of FIG. 1 and/or the electronic device 201 of FIG. 2) may identify whether the motion recognition expression level is a motion recognition expression level for completing gesture recognition.

When identifying that the motion recognition expression level is not the motion recognition expression level for completing gesture recognition in operation 919, the electronic device (e.g., the electronic device 101 of FIG. 1 and/or the electronic device 201 of FIG. 2) may increase the motion recognition level, may increase the motion recognition expression level corresponding to the increased motion recognition level, and may visually provide the process of recognizing the movement of the user for the completion of the recognition of the gesture through the display, based on the increased motion recognition expression level by repeating operation 903, operation 917, and operation 919.

When identifying that the motion recognition expression level is the motion recognition expression level for completing gesture recognition in operation 919, the electronic device (e.g., the electronic device 101 of FIG. 1 and/or the electronic device 201 of FIG. 2) may recognize the gesture, and may execute the function corresponding to the recognition of the gesture in operation 921.

According to an embodiment, when identifying that the motion recognition expression level reaches the fifth motion recognition expression level P5 of 100% representing the feedback value on the fifth movement of the user for the gesture, the electronic device may recognize the gesture, and may execute the function corresponding to the recognition of the gesture.

Figure 10:
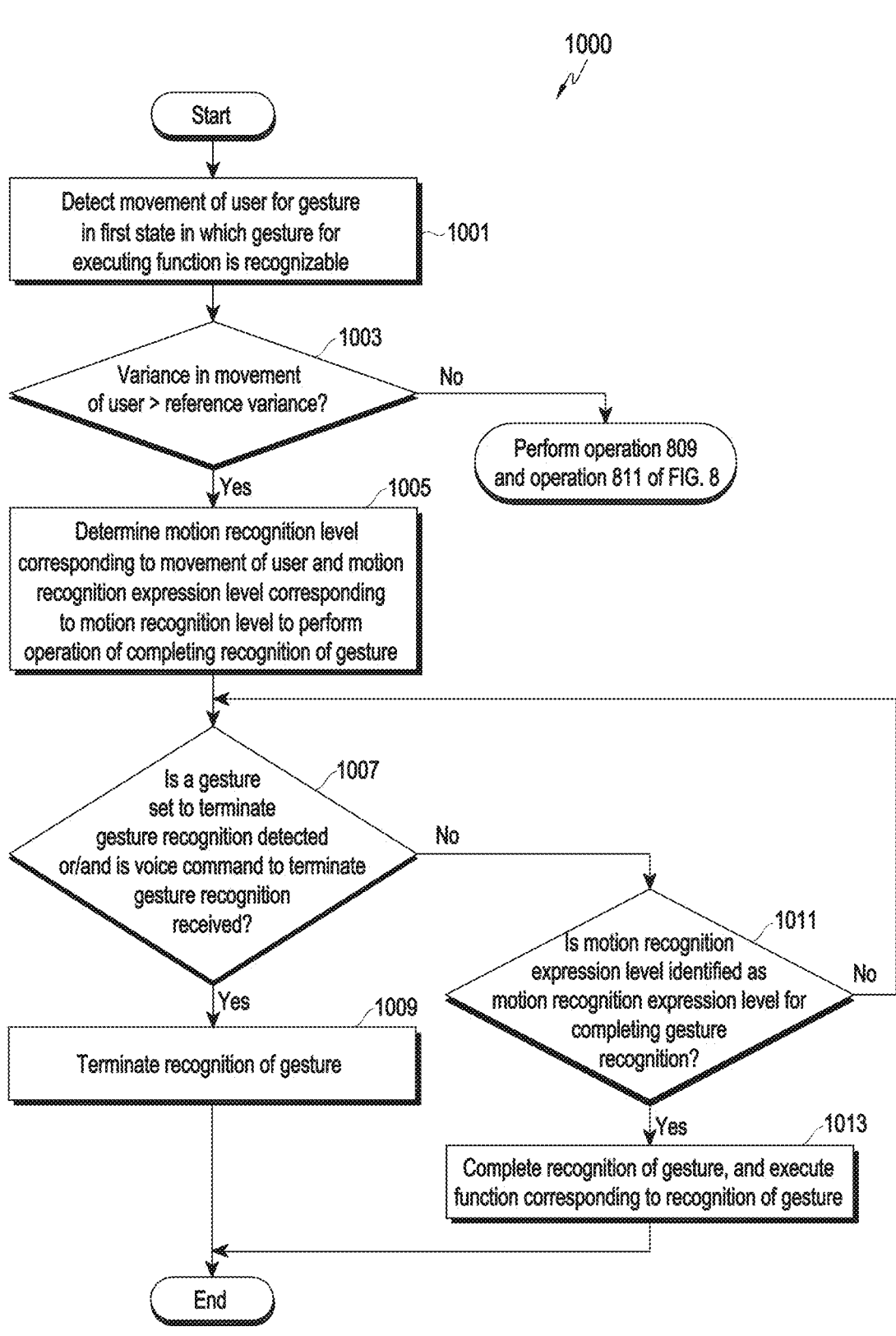
FIG. 10 is a flowchart illustrating an example operation of preventing/reducing misrecognition of a gesture in an electronic device according to various embodiments.

FIG. 10 is a flowchart 1000 illustrating an example operation of preventing/reducing misrecognition of a gesture in an electronic device according to various embodiments. Operations of preventing/reducing the misrecognition of the gesture may include operation 1001 to operation 1013. According to an embodiment, at least one of operation 1001 to operation 1013 may be omitted, some operations may be performed in a different order, or another operation may be added. In the example of FIG. 10, a movement of a recognition object may be illustrated as an example of a movement of a user, and the movement of the user may include a movement of a body part of the user or a movement of a tool used by the user.

In operation 1001, the electronic device (e.g., the electronic device 101 of FIG. 1 and/or the electronic device 201 of FIG. 2) may detect a movement of a user for a gesture in a first state in which a gesture for executing a function is recognizable.

According to an embodiment, in the first state, the electronic device may detect the movement of the user for the gesture, based on an image obtained by a camera module (e.g., the camera module 280) in a state in which the camera module is activated, and may visually provide a process of recognizing the movement of the user for the gesture through a display (e.g., the display 260 of FIG. 2), based on the detected movement of the user.

According to an embodiment, in the first state, the electronic device may determine a motion recognition level corresponding to the detected movement of the user.

In operation 1003, the electronic device (e.g., the electronic device 101 of FIG. 1 and/or the electronic device 201 of FIG. 2) may compare a variance in the movement of the user with a reference variance.

When identifying that the variance in the movement of the user is greater than the reference variance as a result of comparing the variance in the movement of the user with the reference variance in operation 1003, the electronic device (e.g., the electronic device 101 of FIG. 1 and/or the electronic device 201 of FIG. 2) may determine a motion recognition level corresponding to the movement of the user and a motion recognition expression level corresponding to the motion recognition level to perform an operation of completing the recognition of the gesture in operation 1005.

According to an embodiment, the electronic device may determine the motion recognition level corresponding to the detected movement of the user as a motion recognition level increased from the previous motion recognition level, may determine an increased motion recognition expression level, based on an increase in the determined motion recognition level, and may visually provide a process of recognizing the movement of the user for completion of the recognition of the gesture through the display (e.g., the display 260 of FIG. 2), based on the increased motion recognition expression level.

In operation 1007, the electronic device (e.g., the electronic device 101 of FIG. 1 and/or the electronic device 201 of FIG. 2) may identify whether a gesture set to terminate gesture recognition is detected or/and a voice command to terminate gesture recognition is received.

According to an embodiment, in the first state, while visually providing the process of recognizing the movement of the user for the completion of the recognition of the gesture through the display (e.g., the display 260 of FIG. 2), based on the increased motion recognition expression level, before the recognition of the gesture is completed, the electronic device may receive an input of the gesture set to terminate gesture recognition or/and the voice command to terminate gesture recognition (e.g., "terminate gesture recognition" or "no").

When identifying that the gesture set to terminate gesture recognition is detected or/and the voice command to terminate gesture recognition is received in operation 1007, the electronic device (e.g., the electronic device 101 of FIG. 1 and/or the electronic device 201 of FIG. 2) may terminate the recognition of the gesture in operation 1009.

When not identifying that the gesture set to terminate gesture recognition is detected or/and the voice command to terminate gesture recognition is received in operation 1007, the electronic device (e.g., the electronic device 101 of FIG. 1 and/or the electronic device 201 of FIG. 2) may identify whether the motion recognition expression level is a motion recognition expression level for completing gesture recognition.

When identifying that the motion recognition expression level is not the motion recognition expression level for completing gesture recognition in operation 1011, the electronic device (e.g., the electronic device 101 of FIG. 1 and/or the electronic device 201 of FIG. 2) may increase the motion recognition level, may increase the motion recognition expression level corresponding to the increased motion recognition level, and may visually provide the process of recognizing the movement of the user for the completion of the recognition of the gesture through the display, based on the increased motion recognition expression level by repeating operation 1005 and operation 1011.

When identifying that the motion recognition expression level is the motion recognition expression level for completing gesture recognition in operation 1011, the electronic device (e.g., the electronic device 101 of FIG. 1 and/or the electronic device 201 of FIG. 2) may complete the recognition of the gesture, and may execute a function corresponding to the recognition of the gesture in operation 1013.

According to an embodiment, when identifying that the motion recognition expression level reaches a fifth motion recognition expression level P5 of 100% representing a feedback value on a fifth movement of the user for the gesture, the electronic device may complete the recognition of the gesture, and may execute the function corresponding to the recognition of the gesture.

When identifying that the variance in the movement of the user is less than the reference variance as a result of comparing the variance in the movement of the user with the reference variance in operation 1003, the electronic device (e.g., the electronic device 101 of FIG. 1 and/or the electronic device 201 of FIG. 2) may perform operation 805 to operation 811 of FIG. 8.

According to various example embodiments, a method for preventing/reducing misrecognition of a gesture in an electronic device may include: detecting a movement of a recognition object for a gesture through at least one camera of the electronic device in a first state in which a gesture for executing a function is recognizable, and displaying that a recognition of a gesture is in progress on a display of the electronic device until the recognition of the gesture is terminated based on identifying that a variance in the detected movement is less than a reference variance for a specified time.

According to various example embodiments, the displaying may include displaying that the termination of the recognition of the gesture is in progress while displaying information about a remaining time to the termination of the recognition process of the gesture as an image.

According to various example embodiments, the method may further include: determining a motion recognition level representing recognition progress information about the gesture according to the movement based on detecting the movement through the at least one camera in the first state According to various embodiments, the method may further include; determining that the detected movement is a movement different from the gesture being recognized or a movement not to increase a motion recognition level and updating the motion recognition level when identifying that the variance in the detected movement is less than the reference variance for the specified time in the first state; visually displaying that the recognition of the gesture is in progress on the display, based on the updated motion recognition level, until the recognition of the gesture is terminated; and determining to increase a motion recognition level and updating the motion recognition level when identifying that the variance in the detected movement is greater than the reference variance in the first state.

According to various example embodiments, the method may further include: visually displaying progress of the recognition of the gesture on the display, based on the updated motion recognition level According to various embodiments, the method may further include terminating the recognition of the gesture and displaying progress of the recognition of the gesture while increasing a motion recognition level based on detecting a variance in the movement greater than the reference variance while displaying that the recognition of the gesture is in progress According to various embodiments, the method may further include displaying progress of the recognition of the gesture while increasing a motion recognition level when identifying that the variance in the detected movement is greater than the reference variance in the first state, and terminating the recognition of the gesture when detecting a gesture set to terminate the recognition of the gesture while displaying the progress of the recognition of the gesture According to various embodiments, the method may further include displaying progress of the recognition of the gesture while increasing a motion recognition level when identifying that the variance in the detected movement is greater than the reference variance in the first state, and terminating the recognition of the gesture based on receiving a voice instruction to terminate the recognition of the gesture while displaying the progress of the recognition of the gesture.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 501). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

33

34

What is claimed is:

1. An electronic device comprising:

at least one camera;

a display;

at least one processor comprising processor circuitry; and memory storing instructions that, when executed by the at least processor, individually and/or collectively, cause the electronic device to:

detect a movement of a recognition object for a gesture through the at least one camera in a first state in which a gesture for executing a function is recognizable;

display that termination of recognition of a gesture is in progress on the display until the recognition of the gesture is terminated based on identifying that a variance in the detected movement is less than a reference variance for a specified time; and terminate the recognition of the gesture based on a specific condition while displaying a progress of the recognition of the gesture.

2. The electronic device of claim 1, wherein the instructions, when executed by the at least one processor, individually and/or collectively, cause the electronic device to:

display information about a remaining time to the termination of the recognition of the gesture as an image.

3. The electronic device of claim 1, wherein the instructions, when executed by the at least one processor, individually and/or collectively, cause the electronic device to:

determine a motion recognition level representing recognition progress information about the gesture according to the movement based on detecting the movement of the recognition object through the at least one camera in the first state.

4. The electronic device of claim 1, wherein the instructions, when executed by the at least one processor, individually and/or collectively, cause the electronic device to:

determine that the detected movement is a movement different from the gesture being recognized or a movement not to increase a motion recognition level, and update the motion recognition level based on identifying that the variance in the detected movement is less than the reference variance for the specified time in the first state; and visually display that the termination of the recognition of the gesture is in progress on the display, based on the updated motion recognition level, until the recognition of the gesture is terminated.

5. The electronic device of claim 1, wherein the instructions, when executed by the at least one processor, individually and/or collectively, cause the electronic device to:

determine to increase a motion recognition level, and update the motion recognition level based on identifying that the variance in the detected movement is greater than the reference variance in the first state; and visually display progress of the recognition of the gesture on the display, based on the updated motion recognition level.

6. The electronic device of claim 1, wherein the instructions, when executed by the at least one processor, individually and/or collectively, cause the electronic device to:

lift the termination of the recognition of the gesture, and display progress of the recognition of the gesture while increasing a motion recognition level based on detecting the variance in the movement of the recognition object greater than the reference variance while displaying that the recognition of the gesture is in progress.

7. The electronic device of claim 1, wherein the instructions, when executed by the at least one processor, individually and/or collectively, cause the electronic device to:

display progress of the recognition of the gesture while increasing a motion recognition level based on identifying that the variance in the detected movement is greater than the reference variance in the first state; and terminate the recognition of the gesture based on detecting a gesture set to terminate the recognition of the gesture while displaying the progress of the recognition of the gesture.

8. The electronic device of claim 1, wherein the instructions, when executed by the at least one processor, individually and/or collectively, cause the electronic device to:

display progress of the recognition of the gesture while increasing a motion recognition level based on identifying that the variance in the detected movement is greater than the reference variance in the first state; and terminate the recognition of the gesture based on receiving a voice instruction to terminate the recognition of the gesture while displaying the progress of the recognition of the gesture.

9. A method for preventing and/or reducing misrecognition of a gesture in an electronic device, the method comprising:

detecting a movement of a recognition object for a gesture through at least one camera of the electronic device in a first state in which a gesture for executing a function is recognizable;

displaying that termination of recognition of a gesture is in progress on a display of the electronic device until the recognition of the gesture is terminated based on identifying that a variance in the detected movement is less than a reference variance for a specified time; and terminating the recognition of the gesture based on a specific condition while displaying a progress of the recognition of the gesture.

10. The method of claim 9, further comprising determining a motion recognition level representing recognition progress information about the gesture according to the movement based on detecting the movement of the recognition object through the at least one camera in the first state.

11. The method of claim 9, further comprising:

determining that the detected movement is a movement different from the gesture being recognized or a movement not to increase a motion recognition level and updating the motion recognition level based on identifying that the variance in the detected movement is less than the reference variance for the specified time in the first state; and visually displaying that the termination of the recognition of a gesture is in progress on the display, based on the updated motion recognition level, until the recognition of the gesture is terminated.

12. The method of claim 9, further comprising:

determining to increase a motion recognition level and updating the motion recognition level based on identifying that the variance in the detected movement is greater than the reference variance in the first state; and visually displaying progress of the recognition of the gesture on the display, based on the updated motion recognition level.

13. The method of claim 9, further comprising:

lifting the termination of the recognition of the gesture and displaying progress of the recognition of the gesture while increasing a motion recognition level based on detecting the variance in the movement of the recognition object greater than the reference variance while displaying that the recognition of the gesture is in progress.

14. The method of claim 9, further comprising:

displaying progress of the recognition of the gesture while increasing a motion recognition level based on identifying that the variance in the detected movement is greater than the reference variance in the first state; and terminating the recognition of the gesture based on detecting a gesture set to terminate the recognition of the gesture while displaying the progress of the recognition of the gesture.

15. The method of claim 9, further comprising:

displaying progress of the recognition of the gesture while increasing a motion recognition level based on identifying that the variance in the detected movement is greater than the reference variance in the first state; and terminating the recognition of the gesture based on receiving a voice instruction to terminate the recognition of the gesture while displaying the progress of the recognition of the gesture.

\*  \*  \*  \*  \*